US010251805B2

(12) United States Patent
Morbi et al.

(10) Patent No.: US 10,251,805 B2
(45) Date of Patent: *Apr. 9, 2019

(54) CONTROL SYSTEM AND DEVICE FOR PATIENT ASSIST

(71) Applicant: GAITTRONICS INC., Ottawa (CA)

(72) Inventors: Aliasgar Morbi, Ottawa (CA); Mojtaba Ahmadi, Ottawa (CA); Richard Beranek, Gatineau (CA)

(73) Assignee: GaitTronics Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,117

(22) Filed: Dec. 28, 2017

(65) Prior Publication Data

US 2018/0116898 A1 May 3, 2018

Related U.S. Application Data

(63) Continuation of application No. 14/385,554, filed as application No. PCT/CA2013/050251 on Mar. 28, 2013, now Pat. No. 9,907,721.

(Continued)

(51) Int. Cl.
*G05B 11/01* (2006.01)
*A61H 3/00* (2006.01)

(Continued)

(52) U.S. Cl.
CPC ............ *A61H 3/00* (2013.01); *A61G 7/1019* (2013.01); *A61G 7/1048* (2013.01);

(Continued)

(58) Field of Classification Search
CPC ...... A61F 5/0127; A61F 2/442; G01M 7/022; A63B 21/156; A63B 21/0053;

(Continued)

(56) References Cited

U.S. PATENT DOCUMENTS

| | | | | |
|---|---|---|---|---|
| 5,033,460 A | | 7/1991 | Goldish | |
| 5,256,115 A | * | 10/1993 | Scholder ............ | A63B 21/0053 482/4 |

(Continued)

FOREIGN PATENT DOCUMENTS

| | | | |
|---|---|---|---|
| CN | 101332145 A | 7/2008 | |
| CN | 101803988 A | 4/2010 | |

(Continued)

OTHER PUBLICATIONS

ISA/CA, International Search Report and Written Opinion for corresponding PCT International Application No. PCT/CA2013/050251 dated Jun. 21, 2013.

*Primary Examiner* — Tuan A Vu
(74) *Attorney, Agent, or Firm* — Brion Raffoul

(57) ABSTRACT

Systems and methods for use with haptic devices. A control system for haptic devices determines a first course of action based on a user's motion. Prior to implementing the first course of action, the control system determines if the first course of action would lead to instability in the haptic device which could cause an unsafe situation such as failure of its components. If the first course of action would lead to instability, the control device determines a second course of action that would not lead to instability and implements this second course of action. To assist in this second course of action and to prevent potential oscillation in the haptic device, the control system also selectively dampens a projected action of the haptic device. A haptic device using such a control system is also disclosed.

6 Claims, 4 Drawing Sheets

Related U.S. Application Data

(60) Provisional application No. 61/617,134, filed on Mar. 29, 2012.

(51) Int. Cl.
*A61H 1/02* (2006.01)
*A61G 7/10* (2006.01)
*A61H 3/04* (2006.01)

(52) U.S. Cl.
CPC ......... *A61G 7/1053* (2013.01); *A61G 7/1059* (2013.01); *A61H 1/02* (2013.01); *A61H 1/0292* (2013.01); *A61H 3/008* (2013.01); *A61G 2203/10* (2013.01); *A61G 2203/32* (2013.01); *A61G 2203/38* (2013.01); *A61G 2203/723* (2013.01); *A61H 1/0255* (2013.01); *A61H 3/04* (2013.01); *A61H 2003/043* (2013.01); *A61H 2201/018* (2013.01); *A61H 2201/0165* (2013.01); *A61H 2201/163* (2013.01); *A61H 2201/5007* (2013.01); *A61H 2201/5061* (2013.01); *A61H 2201/5064* (2013.01); *A61H 2201/5079* (2013.01); *A61H 2201/5084* (2013.01); *A61H 2201/5097* (2013.01); *A61H 2203/0431* (2013.01); *A61H 2230/625* (2013.01)

(58) Field of Classification Search
CPC ........... G06F 19/00; A61H 1/008; A61H 3/00; A61H 1/0255; A61H 1/292; A61H 2201/5007; A61B 5/024
See application file for complete search history.

(56) References Cited

U.S. PATENT DOCUMENTS

| | | | | |
|---|---|---|---|---|
| 5,256,155 | A | 10/1993 | Scholder | |
| 6,267,737 | B1 * | 7/2001 | Meilus | A61H 1/008 601/108 |
| 2007/0282228 | A1 * | 12/2007 | Einav | G06F 19/00 601/33 |
| 2009/0227925 | A1 * | 9/2009 | McBean | A61F 5/0127 602/16 |
| 2009/0275867 | A1 | 11/2009 | Santos-Munne | |
| 2010/0152001 | A1 | 6/2010 | Gordon | |
| 2011/0274400 | A1 | 11/2011 | Mudd | |
| 2012/0015777 | A1 | 1/2012 | Goel | |
| 2012/0103094 | A1 * | 5/2012 | Tustaniwskyj | G01M 7/022 73/514.29 |
| 2012/0143285 | A1 * | 6/2012 | Wang | A61B 5/024 607/59 |
| 2012/0202656 | A1 * | 8/2012 | Dorsay | A63B 21/156 482/121 |
| 2013/0076157 | A1 * | 3/2013 | Stein | A61F 2/442 307/116 |

FOREIGN PATENT DOCUMENTS

| | | | |
|---|---|---|---|
| EP | 1334901 | A2 | 8/2003 |
| EP | 2070492 | A1 | 6/2009 |
| WO | 2008036746 | A2 | 3/2008 |

* cited by examiner

CONTROL SYSTEM AND DEVICE FOR PATIENT ASSIST

RELATED APPLICATIONS

This application is a Continuation of U.S. patent application Ser. No. 14/385,554 filed Sep. 16, 2014 which is a 371 of PCT/CA2013/050251 filed Mar. 28, 2013 which claims the benefit of U.S. Provisional Patent Application No. 61/617,134 filed Mar. 29, 2012.

TECHNICAL FIELD

The present invention relates to haptic devices and, more specifically, relates to control system methods and devices for controlling haptic devices while ensuring that the components of the haptic devices do not become unstable.

BACKGROUND

Invasive surgery is a very stressful event on the human body. This is especially true if the subject is elderly or is dealing with multiple conditions. After surgery, it is conventional wisdom to have the patient up on his or her feet as soon as possible as this can shorten the healing process. However, as can be imagined, the patient, after suffering the shock of surgery, is quite weak and mostly unable to stand or walk on their own.

To this end, physical therapists assist patients in taking their first tentative steps as early as a day after surgery. This proposition can be fraught with danger as the patient can fall and further injure themselves. Similarly, assisting the patient, who can become a dead weight when they fall, is not a simple matter for the therapist. Usually a therapist may require one or more assistants to assist a single patient regain their mobility.

To cut down on the dangers noted above as well as to reduce the manpower needed, devices which assist such patients are available. Such devices provide support for the patient as he or she regains mobility. Such devices follow the patient as he or she walks. If the patient should fall, these devices are designed to arrest the fall by catching the patient and providing compensating motion to counteract or stop the fall.

One such device is that disclosed in U.S. Pat. No. 7,803,125. This device provides pelvic support to the patient and, by sensing the patient's motion, the device can either move in the direction the patient is moving or, if the patient's motion is sudden, the device can compensate to arrest that sudden motion. Other, similar devices are, of course, also available.

However, one drawback for such devices is that they do not prevent the control system from instability. Because these control systems work by determining how much compensating force or torque is needed to address the system's needs (based on a reference model), the potential for exceeding the device's safety envelope exists. If the force or torque needed exceeds what the system can deliver, the components of the device may fail to function or may be pushed beyond their safety limits. Should the force or torque needed exceed what the system can deliver, then the motion of the device may become erratic, unpredictable, or unsafe, and the device may stop functioning. Due to this, the patient may be placed at risk of injury.

The stability of the interaction between the user and device is directly related to the stability of the control system. The factors that affect the stability of the control system include a variety of factors such as the human operator's and haptic device's dynamics, actuator bandwidth and saturation limits, and the position and admittance control loop parameters. Additionally, the stability of the user-device interaction is also influenced by factors related to the digital implementation of the position and admittance control loops (e.g., sampling rate, quantization, computation delay, and the use of zero-order-holds).

This search for stability directly leads to the design and performance of the system controller for haptic devices.

It is commonly assumed that if the gains of the position loop in the system controller are selected to be sufficiently large, then the haptic device dynamics may be assumed to be approximately linear. Furthermore, if the human dynamics are also assumed to be linear, then a variety of different robust stability measures may be used be to design linear position controllers that guarantee stable user-device interactions in the presence of parametric uncertainties in the estimates of the human operator's and haptic device's dynamics models.

The passivity formalism is also commonly used for designing admittance controllers for haptic devices. Roughly speaking, these controllers—or the conditions that the passivity formalism places upon their design—ensure that the combined user-device system does not generate any energy. Two approaches to passivity-based control dominate the literature. The first class of approaches is based on the idea of selective energy dissipation, and the second class of approaches consists of different techniques for selecting parameters of the control loop and reference model parameters (to satisfy the passivity condition.

Most of the controller design approaches described above assume that the haptic device is controlled using a linear position controller. However, simple linear position controllers may not be adequately robust to external disturbances and uncertainties due to modeling error. This fact has motivated the design of numerous different adaptive control algorithms that use standard Lyapunov stability arguments for designing stable position controllers. These approaches typically assume that the stability of the user-device interaction follows directly from the stability of the position control loop. Other robust admittance controllers based on internal model control and time-delay estimation, variable structure control, and iterative learning control have also been investigated, and similarly guarantee interaction stability via the stability of the position control loop. Moreover, some research has also been directed towards the design of model-free position controllers for admittance-controlled haptics that require little or no information about the robot's dynamic model.

In contrast to ad-hoc implementations based on manual tuning of linear position controllers, the advantages of the different types of controllers described above may be summarized as follows: adaptive controllers can estimate unknown device dynamics, provide robustness against modelling uncertainties, and guarantee interaction stability via the design of a stable position control loop; robust control-based approaches directly guarantee interaction stability in the presence of bounded uncertainties in the human, device, and environment dynamics; and, passivity-based approaches provide a conservative, but dependable guarantee on the interaction stability that is driven primarily by energy transfer considerations. While numerous different approaches for addressing the instability generated by external disturbances and modeling uncertainties exist in the literature, few approaches can account for the potential malfunction of the control system that can occur when during actuator saturation, i.e., when the system's actuators are incapable of generating the force or torque that is requested by the control law used in the control system.

There is therefore a need for systems, methods, and devices which address instabilities which may be generated by actuator saturation. As well, there is a need for similar devices or methods which minimize if not overcome the shortcomings of the prior art.

SUMMARY

The present invention provides systems and methods for use with haptic devices. A control system for haptic devices determines a first course of action based on a user's motion. Prior to implementing the first course of action, the control system determines if the first course of action would lead to instability in the haptic device which could cause an unsafe situation such as failure of its components. If the first course of action would lead to instability, the control device determines a second course of action that would not lead to instability and implements this second course of action. To assist in this second course of action and to prevent potential oscillation in the haptic device, the control system also selectively dampens a projected action of the haptic device. A haptic device using such a control system is also disclosed.

In a first aspect, the present invention provides a method for controlling a haptic device, the method comprising:

receiving a data input derived from sensors indicating a motion of said device;

determining a stability boundary for said device, said stability boundary being based at least on a current position and velocity of said device;

determining a first reaction course of action based on said data input, said first reaction course of action being based on predetermined rules which determine how said haptic device reacts to said motion of said device;

determining if said first reaction course of action will exceed said stability boundary and destabilize a running condition of said haptic device;

in the event said first reaction course of action will destabilize said running condition of said haptic device, determining a second reaction course of action which will not destabilize said running condition and implementing said second reaction course of action.

In a second aspect, the present invention provides a method for controlling a motorized patient assist device, the method comprising:

receiving a data input derived from sensors indicating an activation of at least one component of said device;

determining stability boundaries for components of said device, each of said stability boundaries being based at least on a current state of said components of said device;

determining at least one course of action for said device, said course of action being based on said data input and on predetermined reaction rules for said device;

determining if said at least one course of action will destabilize a running condition of said device by exceeding at least one of said stability boundaries;

in the event said at least one course of action will destabilize said running condition of said device, adjusting said at least one course of action to ensure that said at least one course of action will not destabilize said running condition and implementing said at least one course of action.

In a third aspect, the present invention provides computer readable media having encoded computer readable and computer executable instructions which, when executed, implement a method for controlling a haptic device, the method comprising:

receiving a data input derived from sensors indicating a motion of said device;

determining at least one stability boundary for said device, the or each of said stability boundary being based at least on a current position and velocity of said device;

determining a first reaction course of action based on said data input, said first reaction course of action being based on predetermined rules which determine how said haptic device reacts to said motion of said device;

determining if said first reaction course of action will exceed said stability boundary and destabilize a running condition of said haptic device;

in the event said first reaction course of action will destabilize said running condition of said haptic device, determining a second reaction course of action which will not destabilize said running condition and implementing said second reaction course of action.

In a fourth aspect, the present invention provides a method for controlling a motorized patient assist device, the method comprising:

receiving a data input derived from sensors indicating an activation of at least one component of said device;

determining stability boundaries for components of said device, each of said stability boundaries being based at least on a current state of said components of said device;

determining at least one course of action for said device, said course of action being based on said data input and on predetermined reaction rules for said device;

determining if said at least one course of action will destabilize a running condition of said device by exceeding at least one of said stability boundaries;

in the event said at least one course of action will destabilize said running condition of said device, adjusting said at least one course of action to ensure that said at least one course of action will not destabilize said running condition and implementing said at least one course of action.

In a fifth aspect, the present invention provides a haptic device for use in assisting a user, said device being controlled by a control system which controls said device using a method comprising:

receiving a data input derived from sensors indicating an activation of at least one component of said device;

determining stability boundaries for components of said device, each of said stability boundaries being based at least on a current state of said components of said device;

determining at least one course of action for said device, said course of action being based on said data input and on predetermined reaction rules for said device;

determining if said at least one course of action will destabilize a running condition of said device by exceeding at least one of said stability boundaries;

in the event said at least one course of action will destabilize said running condition of said device, adjusting said at least one course of action to ensure that said at least one course of action will not destabilize said running condition and implementing said at least one course of action.

In a sixth aspect, the present invention provides a motorized patient assist device, the device comprising:

a patient support component for supporting a patient's weight in the event said patient falls;

a mechanically assisted vertical spine coupled to said support component, said spine being configured to provide cushioning support to said patient by way of said support component in the event said patient falls;

a motorized mobile base comprising at least one powered wheel, said mobile base being coupled to said spine;

at least one component for determining forces caused by movements of said patient; and a control system for controlling a movement of said mobile base, said control system being configured to counteract movement caused by a patient's fall.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
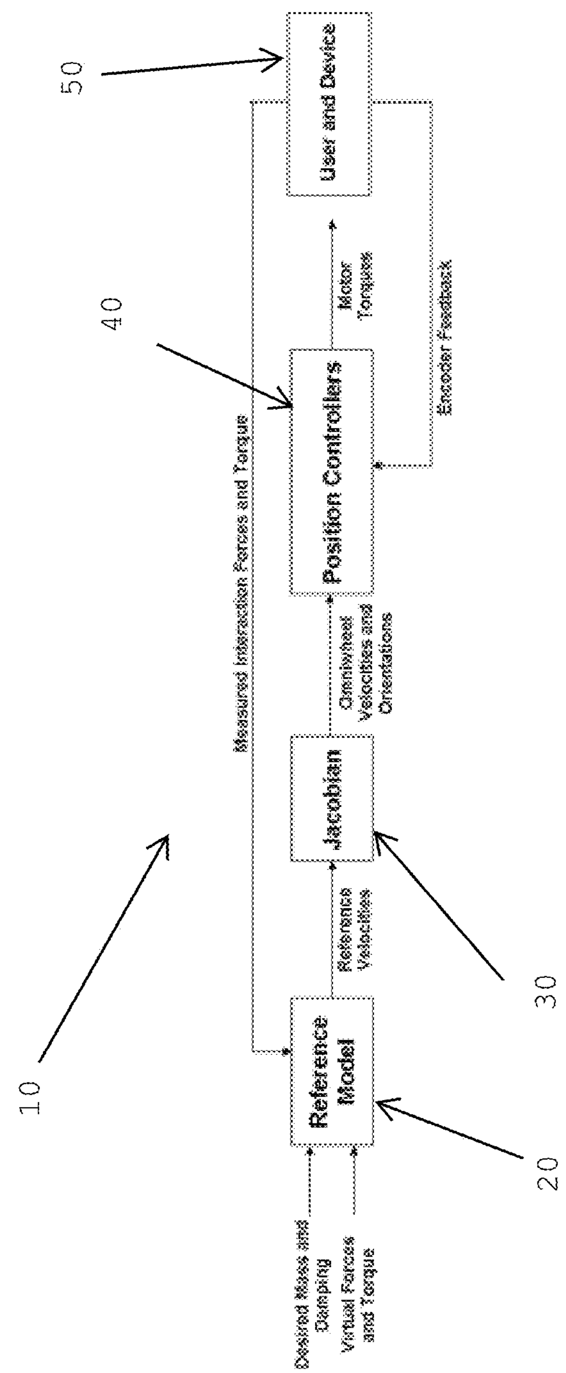
FIG. 1 is a block diagram of a control system according to one aspect of the invention.
Figure 2:
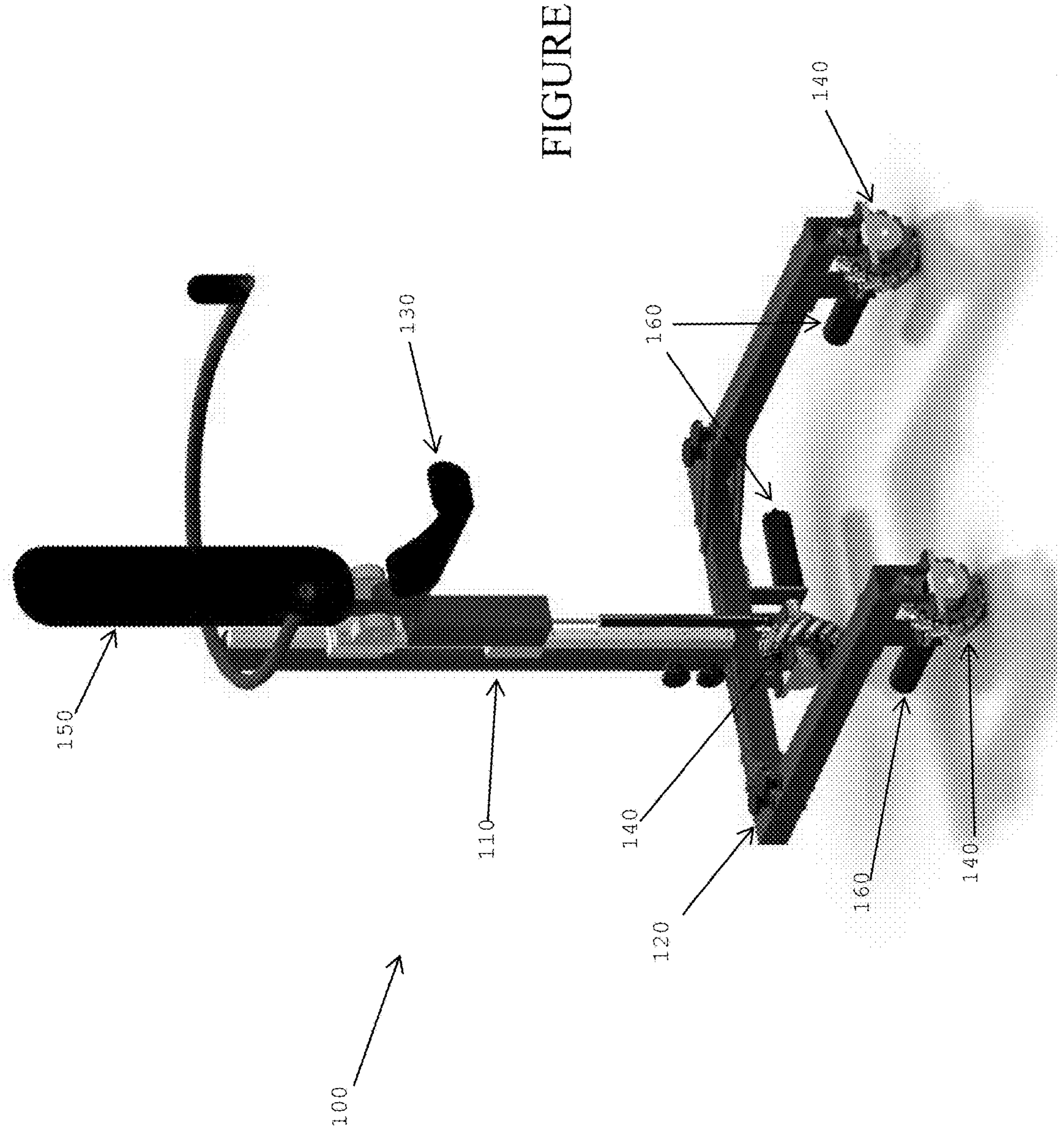
FIG. 2 is an illustration of a haptic device frame according to another aspect of the invention.
Figure 3:
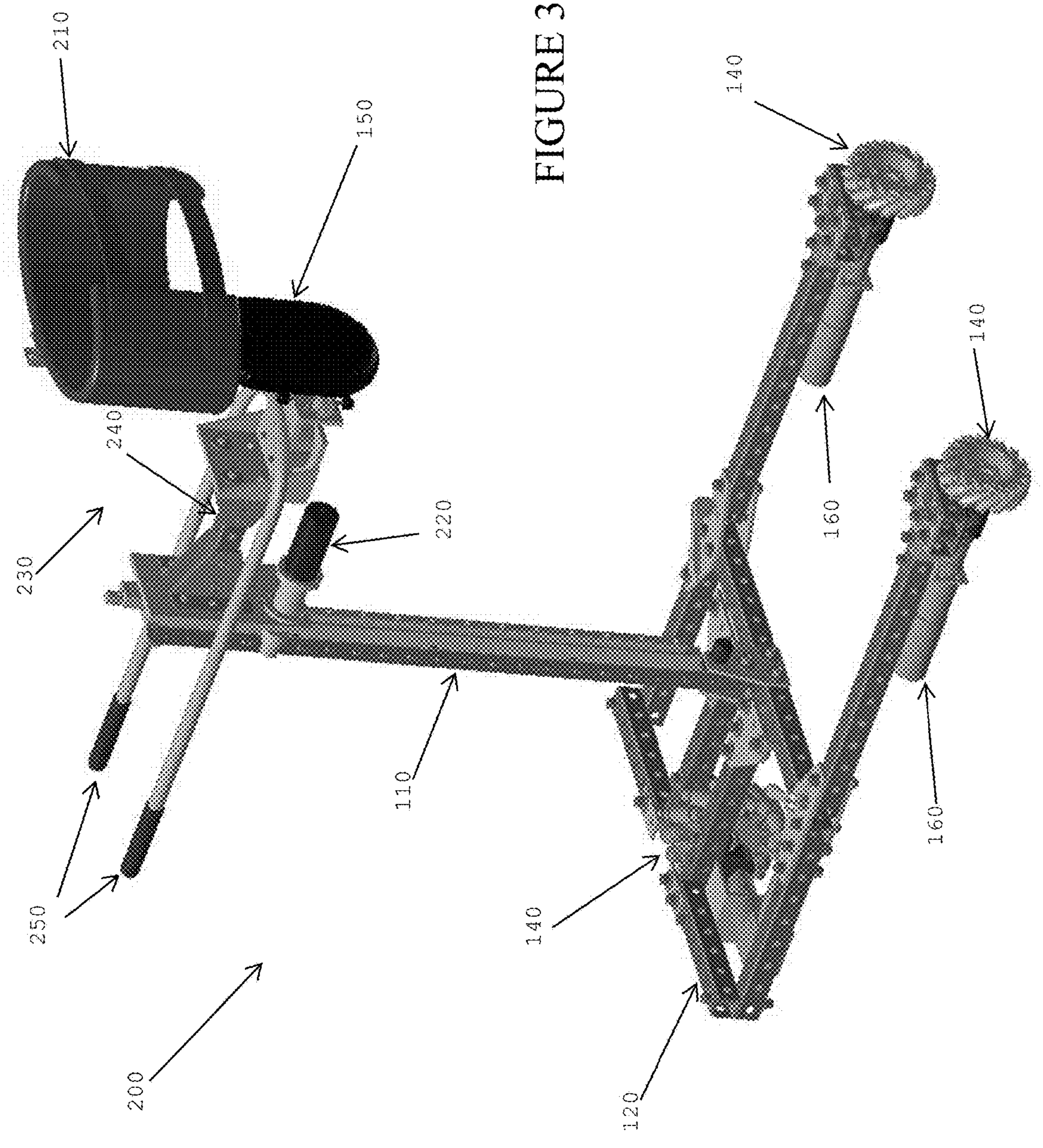
FIG. 3 is an illustration of another implementation of a haptic device according to another aspect of the invention

The present invention has multiple aspects but can be viewed as having two major aspects: the control system referred to in FIG. 1 and the physical haptic device illustrated in FIGS. 2 and 3. The haptic device may be considered to comprise a number of subsystems, namely a mobile base, a lifting system, a computing and sensing system (which is integrated with the control system), and a patient-device interface. These subsystems will be described in detail below.

Referring to FIG. 1, a block diagram of a work flow in a control system according to one aspect of the invention is illustrated. The control system may be used to control a haptic device used by a user to assist him or her in therapy. As well, the control system may be used to control other user devices which need a greater margin of safety than currently available and which depend on user generated inputs to determine a reactive course of action.

As can be seen, the control system 10 uses a reference model 20 which receives input including a damping input, virtual forces and torques, and a feedback input from the user and the haptic device 50. The reference model then produces reference velocities which are then used by a calculation matrix 30 (the Jacobian). The calculation matrix then determines velocities and orientations which are used by position controllers 40. The position controllers 40 then produce the values for motor torques that are sent to the haptic device components 50. The motors on the haptic device then produce these torques in a direction determined by the input from the position controllers. The inputs caused by the user's motion as well as the feedback from the motors are then fed back to either the position controllers or the reference model 20.

It should be noted that the term "position controller", in the context of this document, refers to any method, process, or algorithm that may be used to track the position, velocity, or acceleration generated from the reference model. The term includes methods, processes, or algorithms that may use only acceleration information, only velocity information, only position information, only model feedback terms, or any combination of the above. Also, for the sake of clarity, position controllers, as defined in this document, encompass both the mathematical relationship that calculates the desired output of the actuator as well as the electronics and the computing system that allow the motor to generate this output.

The control system 10 may also operate in a different manner with similar components. As an example, the reference model may produce reference velocities in task space (or joint space) coordinate which can then be transformed into joint space (or task space) coordinates using a kinematic mapping that relates joint space and task space velocities (i.e., the Jacobian matrix) if required in the implementation. The transformed reference velocities may then be integrated to generate reference positions. These reference positions are supplied to a position controller, and the position controllers generate forces or torques in a direction determined by the input from the position controllers. The inputs caused by the user's motion as well as the feedback from the motors are then fed back to either the position controllers or the reference model 20.

In one aspect of the invention, the haptic device may be configured in a well known manner with a suitable frame, suitable wheels, motors to drive or brake the wheels, and a pelvic harness and seat for the user. The pelvic harness would be coupled to a sensor for sensing the direction and magnitude of a user's movement. The motors and/or wheels would be activatable and would be capable of movement in a multitude of directions or would be capable of preventing the frame from moving by applying a braking force. All of these components would be controlled by a control system which receives input from the sensor coupled to the pelvic harness.

It should be noted that while the description refers to a pelvic harness and sensors coupled to the harness, other implementations may use sensors placed at other locations and coupled to other parts of the haptic device. As well, even further implementations may use, instead of sensors, estimators that estimate what is occurring to the haptic device. The estimator can be any type (e.g. Kalman, Unscented Kalman, nonlinear, sliding-mode, disturbance observer, etc.) and would be used to estimate the interaction forces from data of the device's state, the motor output, and a suitable assumed dynamic model of the device. Similarly, instead of a pelvic harness, the device may use a simple harness worn by the user or even a simple sling may be used. The harness need not be a pelvic harness as other types of harnesses, such as a torso harness/support, may be used.

The control system may be based on reference models which determine how the haptic device reacts or acts to inputs caused by the user. The input caused by the user may take the form of an acceleration from the pelvic harness attached to the user, a movement of wheels attached to the device evidencing that the user is dragging the device towards a specific direction, or any other input which may be interpreted as user movement towards a specific direction. The input is, preferably in the form of a vector quantity, showing movement in a particular direction as well as a quantity evidencing velocity or an acceleration.

It should be clear that it is the force that the user applies to the harness/device that is used by the control system. This force can be measured directly using a force sensor or the interaction forces can be estimated using an estimator or observer that uses measurements of the position, velocity, and acceleration of the device, measurements of the motor output, and a suitable dynamic model of the device to estimate the interaction forces and torques. These force/torque measurements can then be turned into motion commands for the device using the reference model. Preferably, interaction forces/torques must be measured or estimated in all the directions in which the device's motion is powered or actuated. The directionality of motion comes from the sign of the force/torque measurements in each of device's actuated directions of motion.

Depending on the input, and the reference models, the control system may operate to assist the user's movement or it may operate to hinder or counteract that movement. One main reason for assisting the user's movement is to move the device in the direction the user may be seeking to move. As can be imagined, the device may be heavy and bulky and activating the device's wheels would assist the user in not having to drag the device's bulk. Hindering or counteracting the user's movement would be done to prevent a potential fall, slip, or some other equally dangerous situation. Similarly, constraining the user's motion may be used for strength training, cardiovascular exercise, or for training purposes.

To assist the user's movement, the control system may activate the device's motors or wheels to proportionally move the device in a specific direction.

To hinder or counteract the user's movement, the control system may apply brakes to the device's wheels or, in more dire circumstances, the control system may activate the motor or wheels in a direction different from the user's movement. The braking force applied or the acceleration applied to the wheels or motor may be proportional to the acceleration or input from the user.

As an example, a user using the haptic device for walking/exercise purposes may attempt to walk in a straight line. As the user moves forward, the direction and velocity of forces applied to the device or acceleration of the motion of the device is sensed or estimated. Upon determining the magnitude and direction of the acceleration or of the forces applied to the device, the control system can activate the motors to move the device in that direction with a speed or acceleration proportional to the user's movement. This way the device moves at a pace which tracks the user without leading (hence pushing the user) or lagging (hence dragging the user).

If the user of the haptic device slips or falls, the rapid acceleration/velocity of the user's body would be detected by the sensors coupled to the pelvic harness and the sensors that detect the speed of device itself. Not only that but the direction of the acceleration/velocity, and hence the direction of the fall, is also detected by sensors connected to the pelvic harness by measuring the velocity vector or the force magnitude. When such unsafe accelerations/velocities are detected, the control system may counteract the direction and magnitude of the acceleration from the fall by activating the wheels or motors to move in a direction which arrests the user's fall. Alternatively, the control system may activate brakes on the wheels and may actuate brakes to provide specific amounts of braking power to arrest the user's fall.

As noted above, one potential issue is the instability of the control system. Since the control system issues commands or sends signals to the motors or the wheels to counteract the detected acceleration of velocity due to an occurring fall, these commands or signals could potentially push the wheels or motors past their safety tolerances. As an example, if the control system detects an unusually large sideways acceleration, the control system could send out a command to quickly move the device in a sideways direction opposite to the detected movement. The magnitude of the motors' excitation may be proportional to the acceleration detected and this could force the motors to try and perform beyond their capabilities. The motors could therefore burn out or simply not function or accelerate and decelerate erratically, thereby allowing the user to fall or otherwise injure himself due to the erratic motion of the device. Such an occurrence would therefore destabilize the haptic device as a whole and would thus put the user at risk.

It should be noted that the unsafe situation described above can also occur due to unstable oscillations, a potential instability in itself. Instability in the control system can be defined as unwanted motions or conditions that interfere with the use of the device or which lead to unsafe user-device interactions.

According to one aspect of the invention, the danger of instability in the system can be addressed by determining if a reactive course of action would tend to destabilize the system. If the course of action would tend to destabilize the system, then the control system would determine a second course of action that would not destabilize the system. The control system would then implement this second course of action. This second course of action may take as simple a form as limiting the first course of action or it may take the form of a completely different course of action such as motion in a direction and magnitude different from the first course of action. Of course, the second course of action may be anything between the two described extremes.

Stability issues may derive from actuator (e.g. motor) saturation. The effects of actuator saturation are of particular concern when a haptic device with limited actuation capability is required to display small impedances. Admittance-controlled haptic devices with well-tuned linear position controllers (e.g., proportional, proportional-derivative, or proportional-integral-derivative controller) cannot be guaranteed to yield stable user-device interactions. Moreover, the instability due to actuator saturation is particularly insidious and dangerous because it is highly dependent on the magnitude and bandwidth of the human input. In practice, a set of admittance and position controller parameters may allow stable user-device interactions for slow user motions. However, a highly dynamic motion that saturates the actuators can lead to instability with little or no warning (e.g., even without any oscillations to signal the onset of instability). As such, controller design for transparency (i.e., the display of soft impedances) must go hand in hand with design for actuator saturation, particularly if haptic devices must display soft impedances during highly dynamic motions (e.g., running with an exoskeleton or with the frame of a haptic device as described above).

The design for such a suitable control system should, ideally, incorporate means and methods that prevent or minimize the effects of actuator saturation (in addition to providing robustness to modelling error and external disturbances). The following provides an analysis of such a suitable control system.

The dynamics of n degree of freedom haptic device in joint-space coordinates may be written as, $$M(q)\ddot{q}+N(q,\dot{q})=J^T F_{int}+\tau \quad (1)$$

where $q \in R^n$ is the generalized coordinate, M(q) is the n×n positive-definite inertia matrix, $N(q,\dot{q})$ is the collection of the Coriolis, viscous and Coulomb damping, and gravitational terms, $F_{int}$ is the interaction force measured at the user-device interface, J is the Jacobian matrix that relates the velocity of the contact interface (e.g., the device end-effector) in the task space to the generalized coordinate q, and τ is a vector of actuator torques. The actuator torques are assumed to be bounded as follows:

$$\tau_{min,i} < \tau_i < \tau_{max,i} \text{ for } i=1,2, \ldots ,n \quad (2)$$

where the subscript i denotes the $i^{th}$ component of a vector, and $\tau_{min,i} = \tau_{min,i}(\dot{q},q,t)$ and $\tau_{max,i} = \tau_{max,i}(\dot{q},q,t)$ are functions that describe the actuators' (possibly) time- or state-varying maximum negative and positive torque limits, respectively.

Assuming that the Jacobian matrix is non-singular, the dynamics in the task space can be written as $$M_x\ddot{x}+N_x(x,\dot{x})=F_{int}+u \quad (3)$$

where $u=J^{-T}\tau$, $N_x=J^{-T}(N(q,\dot{e})-M(q)J^{-1}\dot{J}J^{-1})$, and $M_x=J^{-T}M(q)J^{-1}$. Many robust and model-free position controllers guarantee stability subject to bounds or conditions on the inertia and Coriolis matrices or gravity terms. Such bounds and conditions are not required when the stability boundaries described below are used.

Admittance control is used to impose a specific dynamic relationship at the user-device interface. This relationship is typically defined using a reference model that characterizes the target inertia, damping, and stiffness characteristics of the haptic device. Such a model may be defined as, $$M_d(\ddot{x}_r-\ddot{x}_d)+C_d(\dot{x}_r-\dot{x}_d)+K_d(x_r-x_d)=F_{int}+F_a \quad (4)$$

where $x_r$ is the reference trajectory, $x_d$ is the desired trajectory, and $M_d \in R^{n\times n}$, $C_d \in R^{n\times n}$, $K_d \in R^{n\times n}$ are the desired inertia, damping and stiffness matrices that define the target impedance, and $F_a$ is the feedforward force to be applied to the human operator (i.e., the virtual forces and torques in FIG. 1). The haptic device displays the target impedance about the desired trajectory $x_d$ if it accurately tracks the reference trajectory $x_r$. While (4) defines a rather simple reference model, one of the primary benefits of the stability boundaries is that the stability guarantees they offer are independent of the reference model used to generate the desired user-device interaction. This simple reference model is considered solely for the sake of the exposition, and may be substituted with a variety of other reference models that define the haptic interaction of interest (e.g., a stiff wall, a reference model that prevent undesirable motions such as fall, etc.).

In some cases, it may be desirable to implement the interaction control directly in the joint space, e.g., when an anthropomorphic exoskeleton is used to alter a user's joint properties. In this case, the reference model may be specified directly in the joint space as follows:

$$M_d(\ddot{q}_r-\ddot{q}_d)+C_d(\dot{q}_r-\dot{q}_d)+K_d(q_r-q_d)=J^T(F_{int}+F_a) \quad (5)$$

where $q_r$ is the joint space reference trajectory that the haptic device must track to exhibit the target impedance about some nominal desired trajectory, $q_d$. Again, this simple reference model is used simply for the sake of the exposition and may be replaced with any other arbitrary reference model that describes the interaction of interest.

Admittance-controlled haptic devices rely on a reference model such as (4) to generate the haptic device's reference trajectory. The haptic device displays the target impedance if it accurately tracks the reference trajectory generated from the reference model. Thus, the selection and design of the position controller is crucial as it influences both the stability and performance of the user-device interaction. In reality, most haptic devices exhibit some nonlinear dynamics (e.g., Coulomb friction) and many haptic interactions of interest (e.g., soft-tissue deformation) may be highly nonlinear in nature. Both facts suggest that a simple linear position controller such as a proportional derivative (PD) controller may not be suitable. However, a well-designed (time-varying) bound on the reference acceleration $\ddot{x}_r$ is sufficient for guaranteeing the stability of the position control loop.

In order to facilitate the stability analysis below, the filtered tracking error, a weighted average of the haptic device and reference model states, can be defined as follows:

$$s=(\dot{x}_r-\dot{x})+\Phi(x_r-x) \quad (6)$$

where Φ is a positive-definite diagonal matrix whose diagonal entries are constant. With the filtered tracking error definition given in (4), a task space PD control law may be written as, $$u=-Ks \quad (7)$$

where K is a positive-definite diagonal matrix whose entries define the derivative gain along each axis of motion. The diagonal entries of the matrix KΦ may be interpreted as the proportional gains along each axis of motion. The inputs that must be manipulated to control the motion of the device, the actuator joint torques τ, are related to the actuation forces u via the relation $\tau=J^Tu$. Formulating the task space PD controller in this manner is advantageous because it avoids the inversion of the mass matrix $M_x$. The control law also avoids the inversion of the Jacobian matrix.

It should be noted that while we consider the use of PD controllers for the position control loop, the PD controller can be replaced with other position controllers such as proportional or proportional-integral-derivative controllers, a proportional velocity controller, sliding-mode type position controllers, model-based controller, or other similar controllers. In principle, any position controller that attempts to drive the position tracking error, or the filtered tracking error, to zero could be substituted for (7).

It is also important to note that it is explicitly assumed that all actuators are commanded to generate their maximum positive or negative torque whenever the actuators saturate, i.e., when $(-J^TKs)_i > \tau_{max,i}$ or $(-J^TKs)_i < \tau_{min,i}$. In other words, $J^{-T}\tau$, the actual actuation forces generated at contact interface will not be equal to −Ks, the desired actuation forces calculated from PD control law (7), whenever any of the haptic device's actuators saturate. However, as will be shown below, the stability of the position control loop can be guaranteed even if the actuators saturate and there is an inconsistency between the required and applied actuation forces.

If the interaction control is applied in the in the joint space, the joint space reference trajectory $q_r$ may be obtained from a reference model such as (5), and the corresponding definition of the filtered tracking error, $s_q$, may be used for defining the joint space PD control law:

$$s_q=(\dot{q}_r-\dot{q})+\Phi_q(q_r-q). \quad (8)$$

The joint space PD control law may then be defined as, $$\tau=-K_qs_q. \quad (9)$$

where $K_q$ and $\Phi_q$ are positive-definite diagonal matrices. The diagonal entries of $K_q\Phi_q$ and $K_q$ correspond, respectively, to the proportional and derivative gains for the position controller at each joint.

Again, while we consider the use of PD controllers for the position control loop, the PD controller can be replaced with other position controllers such as proportional or proportional-integral-derivative controllers or sliding-mode type position controllers. In principle, any control law that attempts to drive the joint tracking error, or the filtered tracking error in joint space to zero could be substituted for (9).

Admittance control provides a method for imposing a desired dynamic relationship at the user-device interface. As noted previously, the accuracy and stability of the haptic interaction is partly determined by the device's ability to track the task or joint space reference trajectories. Accordingly, the control objective for task space admittance control reduces to finding the conditions which guarantee that $x \rightarrow x_r$ as $t \rightarrow \infty$ if the PD control law given by (7) is used to track the reference trajectory $x_r$. Similarly, the control objective for joint space admittance control reduces to finding the conditions which guarantee that $q \rightarrow q_r$ as $t \rightarrow \infty$ if the PD control law given by (9) is used to track the reference trajectory $q_r$. Similar conditions would equally apply if something other than a PD controller is used as the position controller.

It follows from (6) and (8), that if $\Phi$ and $\Phi_q$ are selected to be positive-definite, then the control objectives for task space and joint space admittance control are satisfied if there exist some conditions that guarantee that $s \rightarrow 0$ as $t \rightarrow \infty$ and $s_q \rightarrow 0$ as $t \rightarrow \infty$, respectively. In general, these conditions are difficult to find when little or no information about the device dynamics is assumed to be available. However, conditions that guarantee a more practical notion of stability, uniform ultimate boundedness (UUB), can be found even if little knowledge about the device dynamics is available. These conditions ensure that $|s(t_o)|<s_o \rightarrow |s(t)| \le \varepsilon \forall t>t_o+T$ or that $|s_q(t_o)|<s_{q,o} \rightarrow |s_q(t)| \le \varepsilon_q \forall t>t_o+T$, for small positive constants $\varepsilon$ and $\varepsilon_q$ and $T<\infty$.

Moreover, if $|s|$ and $|s_q|$ are UUB, then it follows from (6) and (8) that the tracking errors $x_r-x$ and $q_r-q$ must also be bounded, and that the PD control laws given by (7) and (9) guarantee the stability of the position control loop and provide a tolerance on the accuracy of the haptic display since $|x_r-x| \le f(\varepsilon)$ and $|q_r-q| \le f(\varepsilon_q)$ if $|s|$ and $|s_q|$ can be shown to be UUB.

The above leads to the first of two theorems, presented below, regarding the stability of PD controllers or, indeed, any position controller that drives error or filtered tracking error to zero. It should be noted that the proof of both these theorems has been omitted as they are beyond the scope of this document. Theorem 1 relates to the stability of the task space PD controller:

Theorem 1 Consider a haptic device with dynamics and actuator torque limits given by (3) and (2), respectively, that is required to display an arbitrary target impedance. If the device is controlled by the PD control law given by (7) or controlled by any suitable control law as noted above, then the tracking error $x_r-x$ can be shown to be bounded if the acceleration of the reference model that defines the target impedance $\ddot{x}_r$ is bounded as follows:

$$(\ddot{x}_r)_i > -\Phi_i((\dot{x}_r)_i-(\dot{x})_i)-\Psi_i(sgn)(s))_i-\Gamma_i(s)_i-(\eta)_i \quad (10)$$

$$(\ddot{x}_r)_i < -\Phi_i((\dot{x}_r)_i-(\dot{x})_i)-\Psi_i(sgn)(s))_i-\Gamma_i(s)_i+(\eta)_i \quad (11)$$

where $\Gamma$ and $\Psi$ are positive-definite diagonal matrices, $\eta$ is a vector of constants, sgn(●) denotes the component-wise sign function, $(●)_i$ denotes the $i^{th}$ component of vector quantity, and $\Gamma_i$, $\Phi_i$, and $\Psi_i$ denote the $i^{th}$ diagonal components of the matrices $\Gamma$, $\Phi$, and $\Psi$.

It should be noted that while Theorem 1 above guarantees that the tracking error will remain bounded, it says little about the size of the bound. However, if we consider (6) as a first order filter with output $x-x_r$, then the steady-state value of the filter when $|s|=\varepsilon$ provides an estimate of the maximum tracking error that could be expected during operation, i.e., $$|x-x_r| \le \frac{\varepsilon}{\lambda_{min}(\Phi)} \approx \frac{|\eta|}{\lambda_{min}(\Gamma)\lambda_{min}(\Phi)}. \quad (17)$$

where $\lambda_{min}(\Phi)$ denotes the minimum eigenvalue of $\Phi$, and $\lambda_{min}(\Gamma)$ denotes the minimum eigenvalue of $\Gamma$.

It should further be noted that only measurements of x and $\dot{x}$ are required to implement the stability boundaries. The term $\Psi_i(\mathrm{sgn}(s))_i$ in (10) and (11) compensates for the acceleration term $(\ddot{x})_i$. $\Psi_i(\mathrm{sgn}(s))_i$ may be replaced with $(\ddot{x})_i$ if $(\ddot{x})_i$ is directly measured or estimated, without any change to the stability properties (i.e., the proof still holds even if $\Psi_i(\mathrm{sgn}(s))_i$ is replaced with $(\ddot{x})_i$). Additionally, no information about the haptic device's dynamics are required to implement the controller. However, the formulation does assume the haptic device to be capable of generating bounded accelerations for all possible input trajectories. This is not a strict assumption, however, as most serial manipulators and robotic devices used in haptic simulation easily satisfy this requirement if they have bounded actuator torques and some intrinsic damping. Without this assumption, it is not possible to guarantee that the time derivative of the Lyapunov function remains bounded for all possible input trajectories within the actuators' saturation limits.

The control formulation does not impose any specific constraints on the structure and allowable parameters of the reference model. However, it is important to note that Theorem 1 only guarantees the stability of the position controller. Thus, an active human operator or reference model can still contribute to an oscillating, and potentially unsafe user-device interaction; the acceleration limits (10) and (11) can only guarantee that the tracking error remains bounded and not that oscillations generated from an active human operator or reference model are automatically attentuated. As such, safety concerns suggest that the reference model (i.e., the virtual environment) should also be chosen to generate bounded reference accelerations.

As well, it is of note that no knowledge of the actuators' torque limits or bandwidth (2) are required for implementing the controller. While neither will contribute to the instability of position control loop, both will influence the fidelity of the haptic display if the target impedance is selected beyond the actuators' capabilities. Consider the case where the haptic device is required to display a mass an order of magnitude smaller than its actual mass. A typical PD controller would likely become unstable for highly dynamic device motions, in part, due to the effects of actuator saturation. However, Theorem 1 indicates that if the reference acceleration limits (10) and (11) are used, then the stability of the position control loop is guaranteed regardless of the actuators' torque and bandwidth limits. This is possible because the acceleration limits reshape the error dynamics to guarantee stability without regard for the actual device dynamics, saturation limits, or the target impedance to be displayed.

When the actuator capabilities are consistent with the target impedance to be displayed, the reference acceleration will always remain in between (10) and (11), and the fidelity of the haptic display can be characterized by the maximum tracking error bound given above. However, a discrepancy between the commanded impedance and target impedance is inevitably created whenever either one of (10) or (11) are active. In this case, the controller effectively trades-off display fidelity for stability, e.g., the user may feel that the haptic device is suddenly heavier or less responsive when the acceleration limits are active. However, this trade-off is certainly necessary from a safety point of view, particularly when the haptic device must perform highly dynamic motions. Moreover, this trade-off is very much akin to the performance-passivity trade-off that must be made with the time-domain passivity controllers for haptics. In fact, the general principle of modifying the reference trajectory to ensure stability and a safe user-device interaction is akin to the selective dissipation of energy in the time-domain passivity controller or to the use of a proxy in proxy-based sliding model control.

The second of the theorems noted above refers to the stability of the joint space PD controller as follows:

Theorem 2 Consider a haptic device with dynamics and actuator torque limits given by (1) and (2), respectively, that is required to display an arbitrary target impedance. If the device is controlled by the PD control law given by (9) or by any other suitable control law as noted above, then the tracking error $q_r - q$ can be shown to be bounded if the acceleration of the reference model that defines the target impedance $\ddot{q}$ is bounded as follows:

$$(\ddot{q}_r)_i > -\Phi_{q,i}((\dot{q}_r)_i - (\dot{q})_i) - \Psi_{q,i}(\mathrm{sgn}(s_q))_i - \Gamma_{q,i}(s_q)_i - (\eta_q)_i \quad (18)$$

$$(\ddot{q}_r)_i < -\Phi_{q,i}((\dot{q}_r)_i - (\dot{q})_i) - \Psi_{q,i}(\mathrm{sgn}(s_q))_i - \Gamma_{q,i}(s_q)_i + (\eta_q)_i \quad (19)$$

where $\Gamma_q$ and $\Psi_q$ are positive-definite diagonal matrices, $\eta_q$ is a vector of constants sgn(●) denotes the component-wise sign function, $(●)_i$denotes the $i^{th}$ component of vector quantity, and $\Gamma_{q,i}$, $\Phi_{q,i}$, and $\Psi_{q,i}$ denote the $i^{th}$ diagonal components of the matrices $\Gamma_{q,i}$ , $\Phi_q$, and $\Psi_q$. The term $\Psi_{q,i}(\mathrm{sgn}(s_q))_i$ in (10) and (11) compensates for the acceleration term $(\ddot{q})_i$. $\Psi_{i,q}(\mathrm{sgn}(s_q))_i$ may be replaced with $(\ddot{q})_i$ if $(\ddot{q})_i$ is directly measured or estimated, without any change to the stability properties (i.e., the proof still holds even if $\Psi_{i,q}(\mathrm{sgn}(s_q))_i$ is replaced with $(\ddot{q})_i$).

As noted earlier, an ideal admittance controller should be capable of rendering both rigid contacts and unhindered free motion. However, it is well known that admittance-controlled haptic devices exhibit sustained oscillations or instability when displaying small or soft impedances. Since the task and joint space PD controllers presented in previous sections only guarantee the stability of haptic device's position control loop, these controllers may still exhibit bounded but sustained oscillations when the haptic device is required to display small impedances. Moreover, both simulation studies and experimental evidence suggest that the coupled dynamics between the user, device and reference model impose fundamental limits on the minimum inertia that an admittance-controlled haptic device can display.

The issue of designing interaction controllers for displaying soft impedances has previously been considered. The majority of these controllers enhance transparency by using a feedforward term in the control law that is proportional to the interaction force or the exogenous force generated by the human operator. In contrast, several other approaches are based on the idea of substituting the passivity criterion with less conservative robust stability measures during the controller design procedure; though effective, these techniques require a more complicated controller design procedure and some nominal information about the device and operator dynamics.

Experimental results from servomotor-actuated haptic devices suggests that the sustained limit cycles observed when the haptic device displays a small inertia are also present in the filtered tracking error s (or $s_q$ in the case of the joint space PD control). Moreover, these limit cycles tend to exist primarily when the human operator attempts to remain still, and the magnitude of these limit cycles tends to increase as the apparent inertia is reduced. Thus, using velocity-dependent damping in the reference model is not appropriate as excessively large amounts of damping may be required when the haptic device is required to display a very small inertia.

The method for enhancing the display of soft impedances presented below exploits the fact that the haptic device's sustained oscillations are manifested within the filtered tracking error. The intuitive notion behind this method may be summarized as follows: damping proportional to the high-frequency component of the filtered tracking error s (or $s_q$) is injected into the reference model whenever the high-frequency component of s (or $s_q$) is the same sign as s (or $s_q$) (i.e., when the high-frequency component contributes to the continued growth of the oscillations). More specifically, the experimentally verifired modification to the reference acceleration $\ddot{x}_r$ that effectively attenuates the oscillations in the haptic device's motion may be stated as, $$\ddot{x}_{t,i} = \begin{cases} \ddot{x}_{r,i} + B_i \mathrm{sgn}(s_i)|\hat{s}_i|, & \text{if } \mathrm{sgn}(\hat{s}_i) = \mathrm{sgn}(s_i) \\ \ddot{x}_{r,i}, & \text{if } \mathrm{sgn}(\hat{s}_i) \neq \mathrm{sgn}(s_i) \end{cases} \quad (22)$$

where the subscript i denotes the $i^{th}$ component of a vector, $\ddot{x}_t$ is the modified reference acceleration that is integrated to generate the commanded position of the end-effector, $\hat{s}$ is the resultant signal when s is passed through a high-pass filter, and B is a vector of constants which correspond to the damping coefficients to be used along each axis of the device's motion in the task space. Any unity gain high-pass filter of any order may be used, and the bandwidth may be selected to be just below the fundamental frequency of the sustained oscillations the device would exhibit in the absence of this additional damping. The vector B can be tuned experimentally to achieve the desired degree of performance for a given target impedance; if the selected elements of the B matrix are too small, then some sustained oscillations will remain. If the selected values of B are too large, then the device will be very sluggish and difficult to move. Finally, if s is replaced with $s_q$ and $\ddot{x}_r$ is replaced with $\ddot{q}_r$ in (22), then same algorithm can also be used for joint space PD control. It can also be shown that the condition $\mathrm{sgn}(\hat{s}_i)=\mathrm{sgn}(s_i)$ in (22) is equivalent to the condition that $(\dot{V})_i>0$. Similarly, the condition $\mathrm{sgn}(\hat{s}_i)\neq\mathrm{sgn}(s_i)$ in (22) is equivalent to $(\dot{V})_i<0$. Moreover, the quantity $B_i\mathrm{sgn}(s_i)|\hat{s}_i|$ in (22) may be viewed as the $i^{th}$ component of $\dot{V}$ being passed through a low pass filter and being scaled by a constant (i.e., $B_i\mathrm{sgn}(s_i)|\hat{s}_i|=B_i(\dot{V})_{i,LPF}$ where $(\dot{V})_{i,LPF}$ is $i^{th}$ component of $\dot{V}$ being passed through a low pass filter whose structure, bandwidth, and gain can be ascertained from the high pass filter used to calculate $\hat{s}_i$). In the context of these interpretations, the mechanism that allows (22) to be effective can be understood in another way as well: Equation (22)reduces oscillations and instability because it has the effect of approximately scaling $\dot{V}_i$ by a factor of $$\frac{1}{B_i}$$

whenever $\dot{V}>0$ (i.e., precisely when the system is verging towards instability). The proof of this fact has been omitted as it is beyond the scope of this document.

From the above, in addition to changing the reactive course of action that may cause instability in the haptic device, the control system can also dampen how the motors in the haptic device are used to prevent oscillatory behaviour. In one implementation, the desired acceleration from the motors is damped by adjusting the calculations regarding the reference model.

It should be noted that the control system and associated sensors can be implemented as an embedded computer with data acquisition peripherals, or as a collection of dedicated integrated circuits attached to a micro-controller on a custom-designed board or as something similar. Alternatively, the control system can be implemented as an ASIC.

In one specific implementation, the actions of the different components as well as the control system described above can be summarized as follows:

1. The user moves and applies a force on the haptic device.
2. The force sensor measures this force and the signal is sampled and sent to the computer or microprocessor.

3a. The orientation of the motors are measured. In one implementation, this is done using an encoder attached on the motor shaft and the encoder provides the motor shaft's orientation. The measured motor orientation is scaled by a scaling factor that relates motor position to wheel position. Other devices may be used other than the encoder to measure wheel orientation.

3b. The wheel position measured in step 3a is then numerically differentiated to estimate wheel velocity. Other types of sensors or devices may be used to determine or estimate wheel position and wheel velocity.

3c. Gather data from other sensors (e.g., gyroscopes, acceleration sensors, potentiometers, foot forces sensor, etc.) and send data to processing device such as the microprocessor or computer. The data gathered relate to body properties of interest or data which measures the state of the environment around the haptic device (e.g., proximity sensor(s) that detect if an obstacle is nearby). Some of this data can be used in calculating the virtual forces and torque later on.

3d. The reference trajectory is computed. This is done independently for each axis of motion and this can be done in task space coordinates or joint space coordinates.

4. The interaction forces are filtered by a low-pass filter and otherwise processed before being used in the reference model. A common processing step can include the application of a dead-band.

5a. The interaction forces are transformed so that they are expressed with respect to a coordinate system that is fixed to the device. This step is only necessary if the force sensor somehow moves with respect to the device itself.

5b. Calculate the virtual forces and torques using specific expressions which depend on what the device is doing. As one example, for protecting the user from falls, the virtual forces/torque are non-linear functions of wheel speeds As another example, the virtual forces/torques could be made exactly equal to the forces applied by the user, to thereby stop the device from continuing to move when a fall is detected.

6a. The interaction forces are provided as input to the reference model, and the previous reference velocity and reference position (if necessary) may be used to calculate the desired reference acceleration. This is done by isolating the acceleration term in the reference model and then solving for the acceleration term's numerical value using the numerical values from steps 5a and 5b, and the values of step 9 and step 10 (if necessary) from the previous time step.

6b. Evaluate (22) as given above. As can be seen, (22) will not change the reference acceleration if no additional damping must be applied to minimize oscillations. Otherwise, (22) will change the reference acceleration by $B_i \mathrm{sgn}(s_i)|\hat{s}_i|$ if additional damping is needed. This damping factor (also referred to as selective damping) is taken from (22) above and the result is the total reference acceleration.

7. Once the total reference acceleration is found, the reference acceleration limits are calculated and an upper and lower limit for the reference acceleration is found. This is done by evaluating (10) and (11) above for a task space implementation of control system or using (18) and (19) for a joint space implementation, and provides the stability limits that determine whether a course of action may lead to instability or not.
8. The desired reference acceleration from step 6 is compared to the upper and lower limits calculated in step 7. If the acceleration lies within the limits, then the reference acceleration is not altered as it shows that the course of action does not tend to destabilize the system. If the reference acceleration is greater than the upper limit, then the reference acceleration is capped to the value of the upper limit. Conversely, if the reference acceleration is lesser than the lower limit, then the reference acceleration is capped to the value of the lower limit. This capping to either the higher or lower limit is, for this implementation, the second course of action that is implemented when the first course of action is determined to destabilize the system.
9. A numerical integration step is then performed to calculate the reference velocity from the (potentially) modified reference acceleration from Step 8. The result of this step is stored for the next iteration of the process.
10. A numerical integration step is performed to calculate the reference position from the reference velocity from Step 9. The result of this step is stored for the next iteration of the process.

Once the process above is complete, the following have been accomplished:

a) force data and data from additional sensors on the user's body or on the body of the device have been processed, b) the reference acceleration has been calculated, c) the selective damping for minimizing oscillation has been added to the reference acceleration, d) the acceleration thresholds have been applied, and e) the acceleration result are, after the thresholds have been applied, used to calculate the reference orientation and angular velocity of each wheel.

After the above, the results are then applied to determine what commands are to be passed to each of the motors of the haptic device. In this implementation, a proportional derivative position controller is used on each of the motors. The following steps are then executed for each of the motors:

11. The results from steps 3a, 9, 10, and 3b are applied to the expression of the joint space PD control law (see equation (9))
12. The output or result of step 11 is limited to be between a maximum positive value and a minimal negative value (i.e. a maximum value but with a negative sign). This limits the maximum positive or negative speed and torque that the motor can generate to predetermined safe values.

Once the maximum and minimum limits for each motor are found, the respective commands are then sent to the amplifiers for each of the motors. The following steps are executed for each of the motors:

13. The microprocessor or controller sends a signal proportional to the result of Step 12 to a motor amplifier. This signal can be either a digital or an analog signal.
14. The amplifier interprets the signal and sends current to the motor that will generate the torque requested in step 12.

The control system described above can be used with any open-loop Lyapunov stable haptic device controlled via admittance control (e.g., actuated orthoses, exoskeletons, rehabilitation robots, surgical robots, medical training simulators, manufacturing robots). The control system ultimately provides a stable PD position controller that can be used on any robotic device (for haptics or otherwise). It should similarly provide the stability guarantees against actuator saturation, external disturbances, and unmodelled dynamics in any position control application (provided the robot satisfies some basic stability properties).

It should be noted that while the above describes how the actuators on the mobile base and lifting system need to be controlled to ensure stability, other, broader operating parameters and actions are also possible for the control system. As examples, the control system and its associated sensors may sense input signals from the user, estimate the user's desired motion, collect information from therapists about the therapy requirements, and then process all this information through a method that determines a motion command for the mobile base and the lifting system.

As noted above, the control system may use physically measurable signals which correspond to user inputs. These signals can then be processed to provide a motion command for the device. Alternatively, these signals can be used to provide an estimate of the user's voluntary motion. To this end, any sensors that collect data from the user and the device may be used to provide information about the user's current motion, and may be used to define and/or limit the motion of the device.

The control system may also receive interaction force measurements from the patient-device interface (explained below) to determine how much the user pushes against the device. These measurements can be sensed directly using force torque sensors mounted at the patient-device interface or at different points on the device. For ease of processing, if the sensors are mounted away from the device, a calibration process may be used to relate interaction forces at the patient device interface to those measured at some other point on the device body. Of course, interaction forces may be measured from sensors mounted at multiple different points on the device.

To further expand the control system's capabilities, interaction force measurements from the patient-device interface may be estimated using kinematics measurements of the mobile base, measured motor outputs such as current or torque, along with a dynamic model of the device. The kinematics measurements can be obtained from wheel position/velocity/acceleration sensors, INS/IMU systems that use accelerometers and gyroscopes, as well as active or passive marker based-systems that use a stationary camera to track the position of several markers attached to the body of the device.

Other devices that the user can manipulate physically (e.g., joysticks, switches, radio buttons, knobs, push-buttons, capacitive or resistive touch screens) can also be used to provide information to the control system about how the user wishes to move while the user is attached to the device.

Other sensors which provide different types of signals including bioloigical signals such as ECG, EEG, EMG, pulse rate, blood pressure readings, and rate of oxygen consumption may be used. These sensors may include goniometers, foot pressure sensors, and foot contact sensors. Such sensors which provide information about the user's activity level and/or posture may be used to define or impose limits on the motion of the device.

Other types of sensors that deliver information regarding the mobile base and the lifting system may be used by the control system. The data gathered for the control system and the sensors which may be used are as follows:

- wheel angular position may be measured using optical encoders, magnetic encoders, or potentiometers;
- wheel velocity may be estimated from wheel position, or measured directly using tachometers, or gyroscopes;
- wheel acceleration may be estimated from wheel position/velocity measurements, or measured directly using accelerometers;
- torque generated by the actuators may be measured using current sensors (for electric motors), or it may be measured using torque sensors, force sensors, or pressure sensors mounted in the actuator assembly.

The control system may also use a variety of different control methods to translate user inputs, measured signals, and/or therapist inputs into motion commands for the device. Such control methods include impedance control, admittance control, hybrid force/position control, position control, and compliance control.

The data collected by the sensors on the device body and/or on the body of the user, can be used to track patient progress, diagnose impairments, and generally monitor the health of the patient. The computing system on which the control system resides may provide a wired interface (e.g. a wired interface using any of TCP/IP, IP, Serial, USB, CAN, UDP, Ethernet protocols) or a wireless interface (e.g. a wireless interface using Bluetooth, WiFi, Zigbee standards or similar wireless protocols) for transferring data to a host computer that a caregiver can access. This interface, combined with appropriate software, can also be used to generate remote access to the device. The remote access interface provides health and medical personnel (i.e. therapists, nurses, doctors, and caregivers) options for defining and/or limiting how the device can move. As well, this interface can be used for defining control parameters specific to each patient and for ceasing/starting the operation of the device.

The system can also be used to allow health and medical personnel to run pre-defined operating modes that correspond to particular therapy goals or to the user's impairment level (e.g., assisted walking, active fall-prevention, resisted walking, sit-to-stand exercising, resistance training, etc.).

It should be noted that health and medical personnel must ultimately supervise the use of the device, and must have a means for controlling, restricting, guiding, and/or defining how the device moves and operates. To this end, devices that health and medical personnel can physically manipulate (e.g., joysticks, switches, radio buttons, knobs, push-buttons, capacitive or resistive touch screens) can be used to provide information about how the device should move, or how the motion of the device can be restricted, or to enforce limits on the ways in which the patient can move when attached to the device. Alternatively, a software based interface controlled via computer, smartphone, tablet, or any other computing device may also be used by health and medical personnel for this purpose.

For navigation and safety purposes, information about the device's location within a given environment can be used by the control system. To this end, sensors such as the following may be used:

proximity or range sensors in conjunction with corresponding methods for detecting whether any part of the device is likely to collide with the surroundings, or with individuals who are surrounding the device. These methods may include methods for avoiding collisions (e.g., potential field, virtual forces in the reference model);

capacitive, capacitive displacement sensors, doppler effect (sensors based on effect), eddy-current, inductive, laser rangefinder, magnetic, massive optical (such as charge-coupled devices), massive thermal infrared, photocell (reflective), reflection of ionising radiation, sonar (typically active or passive), ultrasonic sensor (sonar which runs in air) may be used for measuring the device's proximity to obstacles and other individuals.

In the event the device is used to guide a user from one point within a given environment to another point in that environment (e.g., the device is used to automatically or autonomously direct a user from their bed to the x-ray room), the computing system may incorporate localization methods (such as SLAM) for mapping the environment and navigation methods (such A* search) for planning efficient routes within the environment.

To ensure a user's safety, the control system may include a variety of sensors and passive elements, along with dedicated software, for fail-safe operation of the device. These may include:

fuses to prevent excessive currents;

push-button emergency switches that can stop motors and which may be located at various locations on the device, or which may be held remotely by the patient or therapy supervisor;

operator presence control mechanisms (i.e. "dead-man's switch") that require active user or health/medical personnel manipulation before the device can function;

wireless emergency switches for shutting down motors or temporarily pausing the motion of the device;

methods and processes which monitor sensor failure, actuator failure, control system performance, or any other system failures.

Referring to FIG. 2, illustrated is a version of a haptic device 100 according to another aspect of the invention. The implementation illustrated in FIG. 2 has a main spine 110, a mobile base 120, a seat 130, wheels 140 on the mobile base 120, back support 150.

As can be seen from FIG. 2, this implementation of the haptic device and its frame have the following characteristics:

a spring located inside the telescoping main spine 110 with the spring having an adjustable neutral position, thereby allowing different spring resting positions. This allows for users of different heights to properly use the device;

an adjustable base width which may use extendable legs where the extendable legs may be manually extendable or actuators may be used to extend the legs;

an actuated omnidirectional mobile base 120 using omni-wheels, mecanum wheels, swerve drive, or any suitable drive mechanism—the seat height is adjustable long with the height adjustable back rest quick release mechanisms at the joints allow for swift assembly or disassembly foot rests or supports allow users to rest their feet on the device.

The mobile base 120 of the haptic device has a set of powered wheels 140. The mobile base intuitively moves with the patient or it can force the motion of user. When moving with the patient or user, the device makes it easy for patient to drag the device. When forcing the user's motion, it can limit motions to prevent falls or it can constrain a user to walk in only a particular direction. In one implementation, the device uses a three-wheeled, powered omnidirectional mobile base. This implementation uses three brushless DC servomotors which actuate mecanum wheels that are mounted to a metal frame of the mobile base 120.

Other implementations and variants for the mobile base include have the mobile base either omnidirectional or non-omnidirectional. The mobile base may have any number of wheels, any number of which may be powered or unpowered. The unpowered wheels may be used to increase the tipping stability of the device.

One variant has only one wheel which is powered with all other wheels being able to spin freely (i.e., assistance in one direction of motion only). Another variant has two powered wheels with all other wheels spinning freely. This variant may be used to implement a differential steering system for the device. A third variant has three powered wheels with any additional wheels being able to spin freely. This variant would implement an omnidirectional mobile base. These variants may be used to implement a differential steering system, a car-like steering system, swerve drive steering system, or true omnidirectional steering.

Regarding the wheels themselves, a variety of different wheel types may be used. It should be noted that not all wheels (actuated or not) need be of the same type. The wheels may be solid or may be pneumatically-pressured tires. The wheels may also be mecanum wheels or omni-wheels. The implementation illustrated in FIG. 2 has three powered wheels, each wheel being directly powered by a motor 160.

The powered wheels may be actuated in a variety of different ways and they may be actuated with or without a power transmission system. Any type of electric motor may be used (e.g., DC brushed, DC brushless, AC electric motors may be used) as well as any type of actuator including rotary hydraulic actuators, rotary pneumatic actuators, and series elastic actuators. A variety power transmission systems may also be used in conjunction with these actuators. As examples, the power transmission system may be of any of the following types: worm, bevel, spur, planetary gear transmissions, chain drives, belt drives, or friction drives.

It should also be noted that the periphery of the mobile base may be equipped with bumpers or other similar mechanisms that absorb energy. These bumpers would be used for attenuating the effects of collisions with the environment, collisions with the user, and collisions with other people near the device.

Referring to FIG. 3, an illustration of another implementation of a haptic device 200 is illustrated. To contrast the implementation of the haptic device in FIG. 2 with the implementation in FIG. 3, the implementation in FIG. 3 features a harness 210 in place of the seat 130 from FIG. 2. Similar to the implementation in FIG. 2, the haptic device 200 has a back support 150, a spine 110, wheels 140, a mobile base 120, and geared motors 160 for driving the wheels 140.

It should be noted that, in contrast to the implementation in FIG. 2, the haptic device 200 has a motor 220 to adjust the height of the harness 210 to a user's height. The motor 220, also controlled by the control system, is attached to a rack and pinion system on the spine 110. Activation of the motor 220 moves the harness assembly 230 vertically along the spine 110. The motor 220 and the rack and pinion system on the spine 110, in conjunction with the control system, may be used to provide a cushioning effect in the event the user slips or falls. The cushioning effect similar to a spring can be implemented by adding a damping function to the control system, or by designing the virtual torque term in the reference model to emulate the behaviour of a spring.

The harness assembly 230 allows the user to bend forwards or backwards by a certain predetermined distance as the harness assembly 230 pivots about a pivot point 240. The harness assembly 230 is also rotatable about an axis perpendicular to the spine 110. This allows the user freedom of movement even when attached to the harness.

At least one force sensor is coupled to the harness assembly to enable the measurement of the forces acting on the harness assembly. Excessive forces detected on the harness assembly may be used in detecting a user's fall or slip. The detection of such forces allows for the control system to counteract such events and to thereby prevent injury to the user. As well, forward or sideway user movement will exert forces on the harness assembly 230. Once detected, these forces will cause the control system to activate the drive motors in a suitable manner to thereby move the haptic device in the direction of the user's movement. The haptic device can therefore follow the user without the user having to drag the device behind him or her.

As part of the harness assembly 230, the haptic device is equipped with a suitable harness (whether pelvic or otherwise) or a sling wearable by a user. As with other known haptic devices, the harness may be coupled to suitable sensors that detect the user's motion (or the interaction force and torques). The device may have multiple features as detailed below.

The harness in FIG. 3 is one implementation of a patient-device interface. The patient-device interface refers to the structural component that constrains the user to the device. This component may be attached to the device body. Preferably, the patient-device interface is directly attached to the lifting system. The component could also be detachable from the device and mate with another interface on the device (e.g., a belt-tightened vest could be used as the patient-device interface—this vest may always be fixed to the lifting system or it could have the option of being detached from the device as well).

One function of the patient-device interface in one implementation is to distribute loading over one or more regions of the user's body. As an example, when a user's body is suspended within the device, a belt-tightened vest may be used to transfer the reaction force from the vest across the user's chest, back, and shoulders. Possible attachment locations include, but are not limited to pelvis, thighs, chest, shoulders, and other suitable body parts or regions.

The patient-device interface can have multiple separate regions of contact on the body and a separate fastening method at each region of contact. As one example, the patient-device interface may include a vest attached to a user's torso, a seat between the user's thighs, and straps that fit around user's thighs.

From the above, it should be clear that the patient-device interface can support the user's full or partial body-weight when the user falls and/or in the event the user is suspended from the device at any time. The patient-device interface can therefore assist in fall preventions and bed transfers.

The implementation of the haptic device illustrated in FIG. 3 also has two control arms 250. These control arms attach directly to one or more force sensors connected to the harness assembly. A therapist can apply small forces on the force sensor(s) by pushing/pulling on the control arms to thereby cause the device to move. The control arms can therefore act similarly to a joystick which allows the therapist to manipulate the haptic device's motion while the patient is harnessed to the device.

Regarding construction, a variety of different materials may be used for cushioning purposes (e.g., plastic foam, rubberized fiber) for this component.

Different mechanisms may be used to fasten the mating elements of the patient-device. These mechanisms may be activated manually or with an actuator. In one example, a seat-belt like clip may be closed manually by a caregiver to strap in the user. In another example, electric motors in combination with a winch may be used to tighten the belts that hold the vest together.

Preferably, the patient-device interface includes mechanisms for adjusting how tightly the structural elements of the patient-device interface binds to the user's body.

Referring to the device illustrated in FIG. 2, the device preferably includes a force feedback controller which allows the mobile base to seamlessly follow the user. As well, the force feedback controller actively applies forces to the user's torso/pelvis in a very controlled manner for ensuring safety or for meeting training goals. This differentiates the mobile base according to this aspect of the invention from the prior art as other mobile bases that simply follow a speed command proportional to how quickly the user moves or wants to move do not have that aspect of precisely applying forces to the user in a controlled manner.

The seat assembly of the frame is free to move up and down along the length of rear central post. Linear slides (shown in image), a rack and pinion mechanism, and a belt and pulley system are alternatives as to how this linear motion along the post can be implemented. However, other implementations do not limit motion of the seat to only linear motion. The seat is capable of moving in a variety of way to accommodate the natural motion of the user's pelvis. While there are different ways in which the seat can move, these can be actuated such that, in addition to supporting the user, the seat actively alters the user's pelvis/torso motion. This can be done for training purposes or for safety reasons. It should also be noted that the sensor may be attached at attachment points other than the seat. .

As noted above, the haptic device in FIG. 2 has a telescoping main spine which is equipped with a spring. The spring has a number of specific functions, that of preventing the user from falling if the seat is not in a proper position as well that of damping a user's fall, thereby preventing further injury. When the seat moves too far down from a prescribed starting position, the seat mechanism engages and the spring arrests the user from falling further. Once the spring engages, the user is provided with an upward force that keeps him standing and supports his body-weight as well. The prescribed starting position of the spring can be changed by moving the location of the spring. The spring starting location can be altered with a pneumatic actuator or motor driven linear actuator or some other automatic linear motion mechanism. Of course, the term "spring" encompasses multiple possibilities including a coil spring, a torsion spring, a set of bungee cords, a damper or shock absorber, a damper and spring. Essentially, the term “spring” includes any elastic element which generates an upward force whenever the user’s torso falls further to the ground. In other implementations, the spring can be replaced with a linear actuator controlled to emulate the behaviour of a mechanical spring. The device therefore includes a form of energy absorption mechanism which will help stop a fall when the user loses his or her balance.

Another feature of the frame is the presence of a force sensor attached between the seat mechanism and the linear slides. This force sensor measures forces in the X and Y direction, directions which are perpendicular vectors in the face of the plane made by the mobile base of the device. The sensor preferably also measures rotation about an axis perpendicular to this plane as well as forces in the Z direction. A sensor with higher degrees-of-freedom may be used provided these minimum degrees for freedom are available. (For one implementation of the invention, the minimum degrees of freedom encompass the forces in the X and Y direction along with the torque in the rotational axis which is perpendicular to the plane formed by the X and Y axes.) The force/torque that the user applies to the device and the motion of the user will be measured using the sensor, and the measured force/torque and the measured motion will be used to determine how the device moves. In general, the device moves co-operatively with the user’s pelvis/torso motions. This can be accomplished using the system described above and illustrated in the Figures. As well, this can be accomplished using other body attachment points where a similar force/motion measurement is used to guide the motion of the device. The measured force/torques can also be made available to therapists for assessments/training/tracking progress.

A further feature of the frame relates to the linear actuator used in one implementation of the invention. The linear actuator for altering the spring’s position and the spring may be used together to directly support the user’s body-weight (e.g., if the spring position is chosen such that the spring is compressed even when the user stands up (and before they have even fallen), the spring will provide an upwards force to support the user’s body-weight at all times). A linear actuator or some automated linear motion mechanism that quickly and precisely moves the spring position may be used to provide very precise control over the amount of body-weight support. If precise control over body-weight is used, an additional degree of freedom in the force sensor may be desirable so that the vertical force can be measured. Alternatively, a displacement sensor that measures the compression of the spring may be used to estimate the support force that is applied to the user. The device may therefore incorporate various mechanisms to provide actuated body-weight support.

For the implementation illustrated in FIG. 3, the haptic device is equipped with a harness that surrounds the torso/back/pelvis of user. This feature can be used to lift patients out of bed. With the patient sitting upright at the side of their bed, the device will be moved such that the back rest of the device faces the user’s torso. A caregiver assisting the patient attaches the harness to ensure the patient is securely attached to the back rest of the device. Once this is done, the caregiver may secure the patient’s legs to fixtures on the frame. With the patient’s legs secured to the frame, and the harness constraining the user to the back of the device, the caregiver uses a joystick or some other alternate control interface to move the device away from the bed. Since the patient will be secured to the device, the patient will also be moved off the bed safely without risk of falling.

Used as above, the device provides sit-to-stand assistance and acts as a patient transfer system. While patient transfer systems are well-known, most of these devices lift in a vertical or slanted direction to transfer a person to a standing position. None of these known systems use a combination of actuated translational motion on the ground and vertical motion from the linear actuator to transfer a patient from a sitting position to a standing position.

As part of the device, the lifting system refers to the actuated mechanism that lifts the user from their bed/wheelchair/chair to a standing posture. This mechanism allows the frame of the device to translate vertically while supporting a large load. When a patient is attached to this mechanism, the device can counteract the user’s weight and allow the user to translate vertically without expending much effort to do so. In one implementation, a rack and pinion system mounted to a linear support rail enables safe and smooth vertical translations. A DC brushless motor attached to the pinion provides the force necessary to support and vertically propel the user.

As explained above, the lifting system can also be active when the user walks with the device. It can simply follow the user’s voluntary motion or it can force or restrict the user’s motion in some way (e.g., it can limit how far to the ground the user is allowed to fall). The lifting system can work in coordination with the mobile base (as noted above) or without any motion or movement from the mobile base. The lifting system would be used to suspend the patient if/when a fall is detected by the computing system. The lifting system can also be used to support a portion of the user’s body weight while the user walks in the device.

Preferably, the lifting system is actuated to support loads in the vertical direction. For this feature, the lifting system has a power transmission system and motion guidance system. This ensures that the user and device are supported by the mechanical structure of the lifting system and allows the user and the device to translate and/or rotate in a predictable way, with undesired motion (e.g., sideways motions) being inhibited.

The lifting system can be actuated using a variety of different actuators. Any type of electric motor, with or without a transmission, may be used. As examples, DC brushed, DC brushless, AC electric motors, and linear motors may be used. Other actuators may also be used. Rotary hydraulic actuators, rotary pneumatic actuators, series elastic actuators can also be used both with or without transmission systems.

Regarding transmission systems for the lifting system, a variety of power transmission equipment may be used in conjunction with actuators mentioned above. Power transmission systems which may be used with the lifting system include worm, bevel, spur, planetary gear transmissions, chain drives, belt drives, friction drives, ball screw, Acme screw, rack and pinion, roller screw, power screw, and roller pinion linear drives. Such power transmission systems amplify torque and speed and/or convert rotary motion to linear motion.

As an alternative, a manual actuation system may be used. Such a manual actuation system may be of the following types: a hand crank, winch, reel, lever, and/or counterweight. These manual actuation systems would require the patient or caregiver to supply some, or all of the energy input to generate the lifting action.

A combined actuator-passive support system may also be used in the lifting system. An actuator can generate the primary lifting action and can then be locked thereafter. In conjunction with this, a passive support system based on any one or more of counter-weights, springs, and dampers can be used to provide graduated body-weight support. This can also be used for elastic resistance to falling.

The lifting system may also use a variety of different motion guidance systems. The motion guidance system restricts motions in some directions while allowing free motion in only a very limited set of directions. The actuator and power transmission system generate and control the motion generated along the "free" direction(s) of motion of the motion guidance system. As examples, a linear profile guide may be used to generate fully supported linear translation while a planar linkage may be used to generate a pre-defined arc of motion in a plane using a four-bar linkage, parallelogram linkage, or a slider-crank.

It should be noted that the combination of the actuator, power transmission system, and motion guidance system may or may not have the capability to be backdrivable.

To ensure safe operation of the lifting system as well as of the device itself, bumpers, physical hard stops, and other energy absorptions mechanisms may be embedded at the travel limits of the lifting mechanism. This would ensure safe collisions between the lifting system's translating component and stationary components.

To further safeguard the user's safety, proximity sensors and/or contact switches may be embedded at the travel limits of the lifting mechanism. These sensors may provide information from these sensors which can be used to gauge when the travel limits are being approached. Such information can thereby allow the actuator to be turned off or otherwise controlled to avoid collisions between the translating component and the stationary component of the lifting system.

Yet a further safety feature of the lifting system includes position sensors which measure or determine the current position of the translating component relative to its travel limits. Absolute or incremental position sensors which may be used for this purpose include linear/rotary optical or magnetic encoders, linear or rotary potentiometers, tachometers, LVDT, and tilt/inclination sensors. The sensors may be attached to the actuator, power transmission system, or elsewhere in the motion guidance system.

It should be noted that the lifting mechanism can be used to connect the patient-device interface to the translating component of the lifting system.

A measuring sensor or sensors may also be used with the lifting system to measure how much of the user's body-weight is supported by the lifting system. Such sensors include force sensors, pressure sensors, or displacement sensors coupled to a compliant element such as s spring.

The implementation illustrated in FIG. 3 can be used with the control system to implement the capabilities described above. The motor 220 attached to the rack and pinion gearing system used in the spine 110 can be used with the control system described above to cushion falls, provide lifting support, as well as provide sit-to-stand support. Force in the vertical direction of the spine is sensed by at least one force sensor. The measured force is then passed through the reference model to generate a motion command for the motor 220. The motion command for the motor 220 can be used to provide the functionalities explained above. Since the user's vertical motion is automatically tracked when the user moves up and down, the motion command can be used to provide support for when the user practices sit-to-stand movements. As well, body weight assistance can be provided through the Virtual Force Term used in the control system (e.g., setting Virtual Force=(0.5*user's body weight) will effectively support half of the user's body-weight while the user walks with the haptic device). A vertical displacement measurement subsystem in the haptic device can be used to determine where the harness is relative to the bottom of the device. This subsystem can take the form of a linear potentiometer in conjunction with an encoder on the motor 220. This measurement subsystem can be used to determine if a fall is occurring and the fall can be prevented by braking the motor. Alternatively, the fall can be prevented by using the motor power to resist the user's body weight. The fall can also be detected by determining when either a large downward force is being applied or when the harness position is determined to be too close to the ground.

As a further safeguard against falls, a fall may not even occur as the control system can be configured to prevent a user from "falling" or moving downwardly beyond a certain predetermined downward distance. Of course, this distance can be configurable to account for different heights, conditions, and circumstances.

Figure 4:
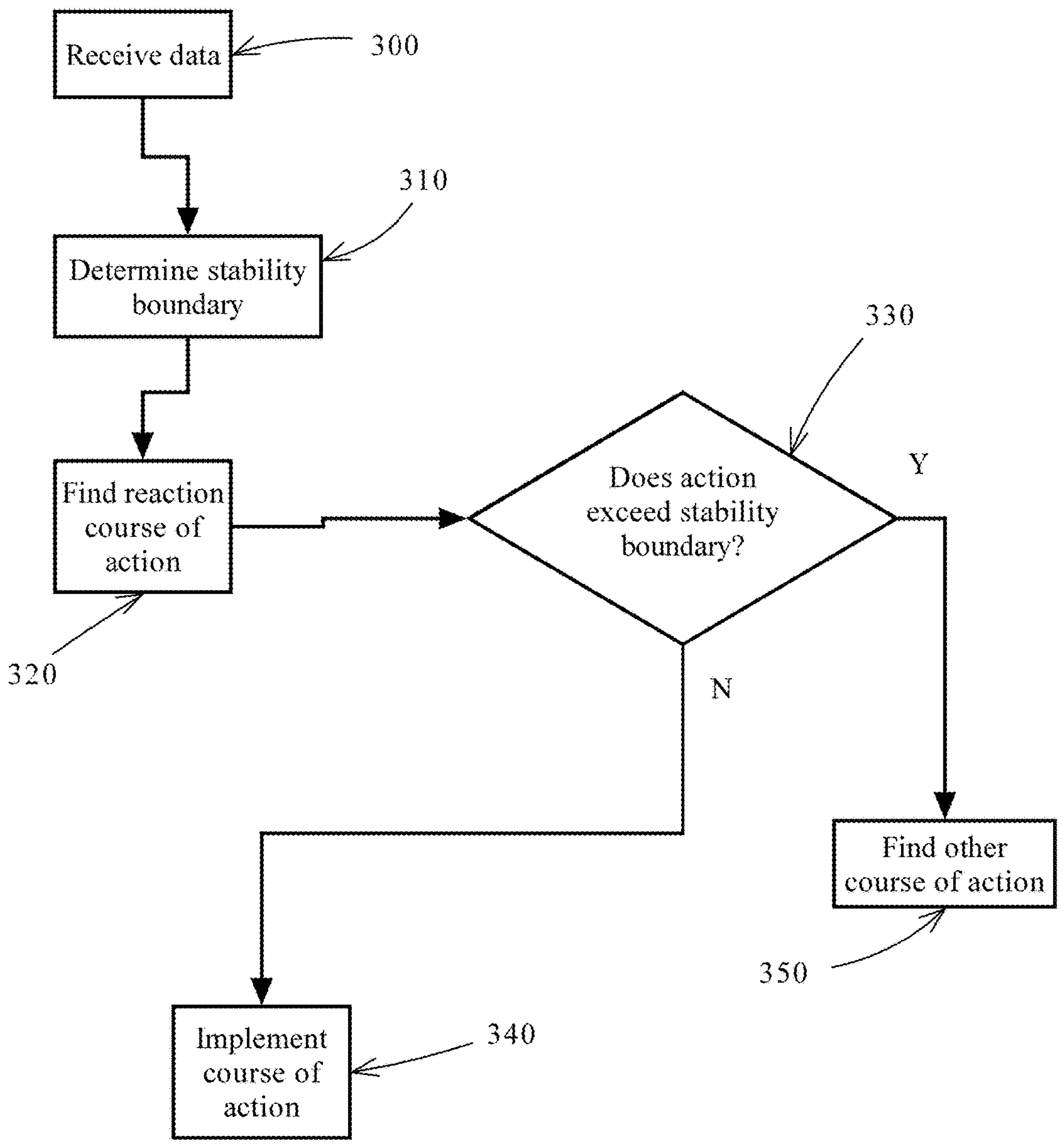
FIG. 4 is a flowchart detailing the steps in a method according to another aspect of the invention.

Referring to FIG. 4, a flowchart detailing the steps in a process according to another aspect of the invention is illustrated. The process relates to the control of the haptic device as implemented by the control system. The first step (step 300) is that of receiving data input from the sensors with the data indicating a motion of the haptic device. Step 310 is that of determining at least one stability boundary which is based on the position and velocity (and possibly the acceleration) of the haptic device. Once the stability boundary has been determined, a reaction course of action is then found based on the data input (step 320). This reaction course of action is based on predetermined rules for reacting to specific motions of the device. Step 330 then determines if the reaction course of action will exceed the stability boundary. If the reaction course of action does not exceed the stability boundary, then the course of action is implemented (step 340). If the reaction course of action will exceed the stability boundary, then another course of action is determined (step 350).

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object-oriented language (e.g."C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A control system for controlling a movement of a motorized patient assist device, said motorized patient assist device comprising a motorized mobile base and a subsystem having a mechanically assisted vertical spine and a patient support component, the control system comprising:

at least one first device coupled to said subsystem, said mechanically assisted vertical spine being coupled to a patient by way of said patient support component, said at least one device being for determining a direction and magnitude of said patient's movement;

at least one second device coupled to said motorized mobile base, said motorized mobile base comprising at least one powered wheel, said at least one device coupled to said motorized mobile base being for determining a direction and magnitude of forces acting on said motorized mobile base;

at least one processor for calculating stability boundaries for at least said motorized mobile base and said mechanically assisted vertical spine, each of said stability boundaries being based at least on one of a position and a velocity of said mobile base or of said mechanically assisted vertical spine, said stability boundaries being limits for said mobile base or for said mechanically assisted vertical spine such that if said limits are exceeded, a probability of instability in said control system is increased;

at least one controller for controlling a movement of said motorized mobile base and for controlling a movement of said mechanically assisted vertical spine;

wherein said control system detects an activation of at least one of:
said mechanically assisted vertical spine,
said motorized mobile base, and
said patient support component based on data input from said at least one first device and from said at least one second device;

said control system determines at least one course of action for said motorized patient assist device based on said data input and based on predetermined reaction rules for said motorized patient assist device, said at least one course of action using at least one of: said mechanically assisted vertical spine and said motorized mobile base, said at least one course of action being for assisting or counteracting said patient's movement;

using said at least one processor, said control system calculates parameters of said at least one course of action and compares said parameters with said stability boundaries to determine if said at least one course of action will destabilize a running condition of said motorized patient assist device by exceeding at least one of said stability boundaries;

using said at least one processor, said control system adjusts said at least one course of action in the event said at least one course of action will destabilize said running condition of said motorized patient assist device to result in an adjusted at least one course of action, said adjusted at least one course of action having parameters that do not exceed said stability boundaries; and said controller implements said adjusted at least one course of action by activating at least one of said mobile base and said mechanically assisted vertical spine in a predetermined manner to result in said adjusted at least one course of action with parameters that do not exceed said stability boundaries.

2. A control system according to claim 1, wherein said control system controls a movement of a mechanism of said spine.

3. A control system according to claim 2, wherein said mechanism comprises at least one motor controlled by said controller and a transmission subsystem.

4. A control system according to claim 1, wherein said patient support component comprises a harness.

5. A control system according to claim 1, wherein said patient support component comprises a seat.

6. A control system according to claim 1, wherein said adjusted at least one course of action comprises limiting a magnitude of said at least one course of action.

* * * * *